United States Patent
Deng et al.

(10) Patent No.: US 11,001,219 B2
(45) Date of Patent: May 11, 2021

(54) AIRBAG WITH EXTERNAL TUNNELS

(71) Applicant: Ford Global Technologies, LLC, Dearborn, MI (US)

(72) Inventors: Zhibing Deng, Northville, MI (US); Deepak Patel, Canton, MI (US); Joseph E. Abramczyk, Farmington Hills, MI (US); Jeffrey C. Paddock, Dearborn Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 145 days.

(21) Appl. No.: 16/401,448

(22) Filed: May 2, 2019

(65) Prior Publication Data

US 2020/0346608 A1 Nov. 5, 2020

(51) Int. Cl.
*B60R 21/231* (2011.01)
*B60R 21/26* (2011.01)
*B60R 21/207* (2006.01)
*B60R 21/235* (2006.01)

(52) U.S. Cl.
CPC .......... *B60R 21/231* (2013.01); *B60R 21/207* (2013.01); *B60R 21/235* (2013.01); *B60R 21/23138* (2013.01); *B60R 21/26* (2013.01); *B60R 2021/23146* (2013.01); *B60R 2021/23509* (2013.01); *B60R 2021/23576* (2013.01)

(58) Field of Classification Search
CPC ..... B60R 21/231; B60R 21/26; B60R 21/207; B60R 21/235; B60R 2021/26576; B60R 2021/23509
See application file for complete search history.

(56) References Cited

U.S. PATENT DOCUMENTS

| | | | |
|---|---|---|---|
| 5,626,358 A * | 5/1997 | Ricks | B60Q 5/003 280/731 |
| 5,727,812 A * | 3/1998 | Dykstra | B60R 21/201 200/61.54 |
| 6,517,110 B1 * | 2/2003 | Butters | B60R 21/201 280/730.2 |
| 7,500,694 B2 | 3/2009 | Heudorfer et al. | |
| 7,954,844 B2 * | 6/2011 | Kamiyama | B60R 21/2338 280/729 |
| 8,020,888 B2 | 9/2011 | Cheal et al. | |
| 8,500,162 B2 | 8/2013 | Moffitt et al. | |
| 8,840,134 B2 | 9/2014 | Lechelt et al. | |
| 9,487,180 B2 | 11/2016 | Nakashima | |
| 9,637,081 B2 | 5/2017 | Ryan et al. | |
| 10,703,322 B2 * | 7/2020 | Kitagawa | B60R 21/2338 |

* cited by examiner

*Primary Examiner* — Paul N Dickson
*Assistant Examiner* — Caitlin Anne Miller
(74) *Attorney, Agent, or Firm* — Frank A. MacKenzie; Bejin Bieneman PLC (57) ABSTRACT

A restraint system includes an inflator, an airbag inflatable by the inflator and having an exterior surface, and a fabric tunnel attached on the exterior surface of the airbag and elongated from a sealed end to an open end. The tunnel is fluidly isolated from the inflator. The tunnel is oriented relative to the airbag so that the open end is aimed in a direction of motion during inflation of the airbag.

17 Claims, 7 Drawing Sheets

FIG. 6

AIRBAG WITH EXTERNAL TUNNELS

BACKGROUND

Vehicles are equipped with airbags. In the event of an impact, an inflator activates and provides inflation medium to the airbags pressurize and act as cushions for occupants during the impact. The airbags are located at various fixed positions in passenger cabins of vehicles. Vehicles typically include a driver airbag mounted in the steering wheel, a passenger airbag mounted in the dashboard in a vehicle-forward direction from the passenger seat, and side curtain airbags mounted in the roof rails.

DETAILED DESCRIPTION

A restraint system includes an inflator, an airbag inflatable by the inflator and having an exterior surface, and a fabric tunnel attached on the exterior surface of the airbag and elongated from a sealed end to an open end. The tunnel is fluidly isolated from the inflator.

The tunnel may be oriented relative to the airbag so that the open end is aimed in a direction of motion during inflation of the airbag.

The open end may be open to an environment external to the airbag.

The tunnel may include a seam and a tunnel panel stitched to itself along the seam from the sealed end to the open end. The tunnel may be attached to the airbag along the seam. Between the sealed end and the open end, the tunnel may be attached to the airbag only along the seam.

The seam may be a first seam, the tunnel may include a second seam sealing the sealed end, and the tunnel may be attached to the airbag along the second seam.

The tunnel may be a first tunnel, the restraint system may further include a second tunnel disposed on the exterior surface of the airbag and elongated from a sealed end to an open end, and the second tunnel may be fluidly isolated from the inflator. The open ends of the first tunnel and the second tunnel may be open to an environment external to the airbag, and the first tunnel and the second tunnel may be otherwise fluidly isolated from each other.

The first tunnel and the second tunnel may partially overlap along the exterior surface of the airbag.

The restraint system may further include a seatback, and the airbag may be inflatable from an uninflated position disposed in the seatback. The seatback may include a side panel, and the airbag may be inflatable from the side panel.

The airbag may be inflatable in a forward direction relative to the seatback from the uninflated position to an inflated position, and the tunnel may be oriented relative to the airbag so that the open end is forwardmost and the sealed end is rearwardmost when the airbag is in the inflated position.

The airbag may be inflatable to an inflated position, the airbag may include an outboard panel, an inboard panel, and an airbag seam at which the outboard panel is sewn to the inboard panel, the airbag seam may be at a top of the airbag when the airbag is in the inflated position, and the tunnel may be attached to the airbag at the airbag seam. The tunnel may include a first seam and a tunnel panel stitched to itself along the first seam from the sealed end to the open end, and the first seam may be sewn to the airbag seam.

The airbag may be inflatable to an inflated position between an occupant sitting against the seatback and a window nearest the seatback. The tunnel may be above a top of a door panel to which the window is mounted when the airbag is in the inflated position, and the airbag in the inflated position may extend below the top of the door panel.

With reference to the Figures, a restraint system 32 for a vehicle 30 includes an inflator 34, an airbag 36 inflatable by the inflator 34 and having an exterior surface 38, and a fabric first tunnel 40 attached on the exterior surface 38 of the airbag 36 and elongated from a sealed end 44 to an open end 46. The first tunnel 40 is fluidly isolated from the inflator 34.

The first tunnel 40 (as well as possibly a second tunnel 42, as described below) can help protect the airbag 36 from broken glass or other sharp objects during an impact to the vehicle 30. The first tunnel 40 and second tunnel 42 expand because of the motion of the airbag 36 during inflation—not because of inflation medium from the inflator 34. The expansion of the tunnels 40, 42 provides a protective cushion for the airbag 36. Moreover, the material constituting the tunnels 40, 42 can provide protection for the airbag 36 even if the tunnels 40, 42 are not expanded.

Figure 1:
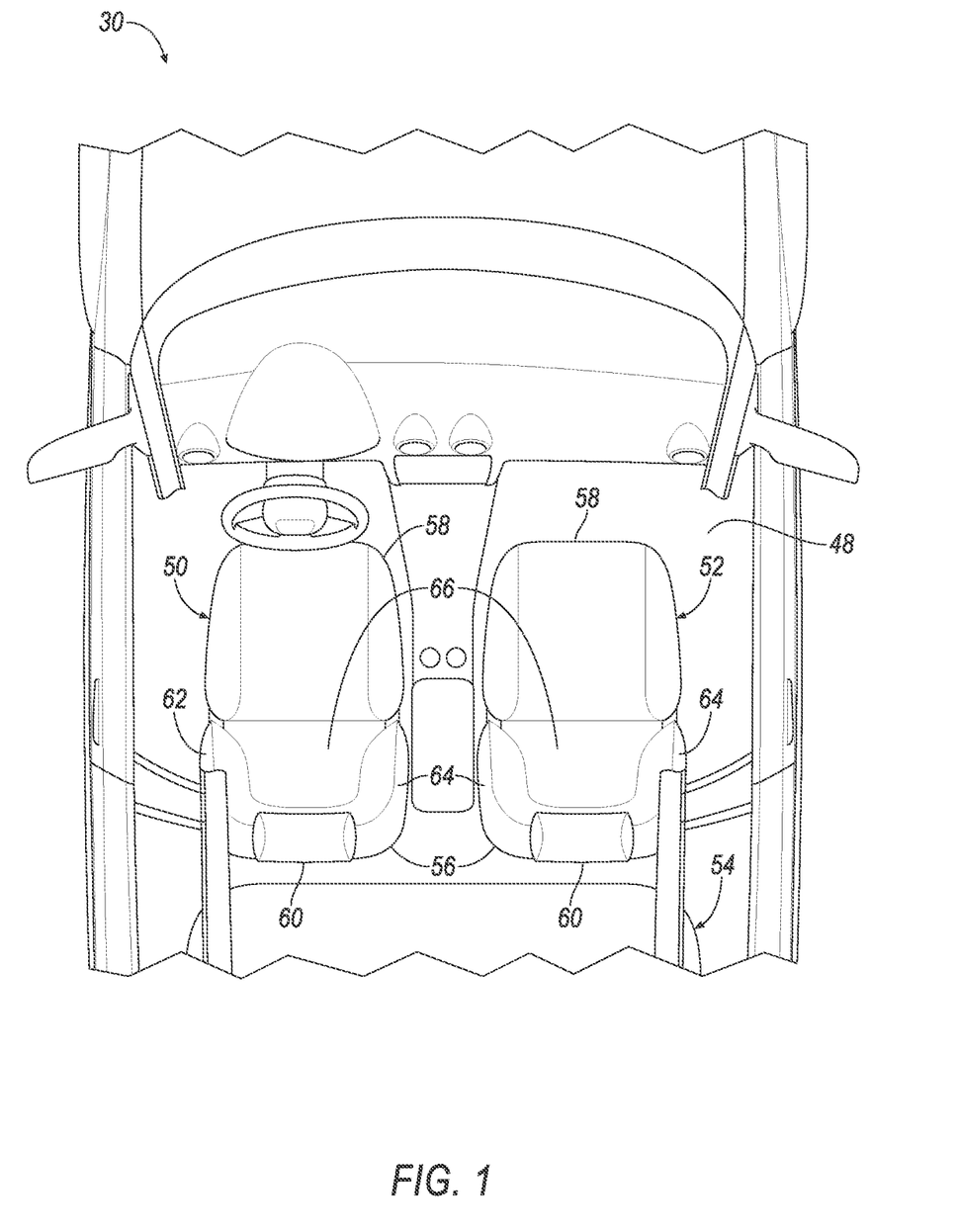
FIG. 1 is a top view of a vehicle with a passenger cabin exposed for illustration.

With reference to FIG. 1, the vehicle 30 may be any passenger or commercial automobile such as a car, a truck, a sport utility vehicle, a crossover, a van, a minivan, a taxi, a bus, etc.

The vehicle 30 includes a passenger cabin 48 to house occupants, if any, of the vehicle 30. The passenger cabin 48 includes a driver seat 50 and a passenger seat 52 disposed at a front of the passenger cabin 48 and one or more back seats 54 disposed behind the driver and passenger seats 50, 52. The passenger cabin 48 may also include third-row seats (not shown) at a rear of the passenger cabin 48. In FIG. 1, the driver and passenger seats 50, 52 are shown to be bucket seats, and the back seats 54 are shown to be bench seats, but the seats 50, 52, 54 may be other types. The position and orientation of the seats 50, 52, 54 and components thereof may be adjustable by an occupant. While the rest of this disclosure is described in terms of the driver seat 50, the following description can be applied equally to the passenger seat 52, the back seats 54, or the third-row seats if present.

Figure 2:
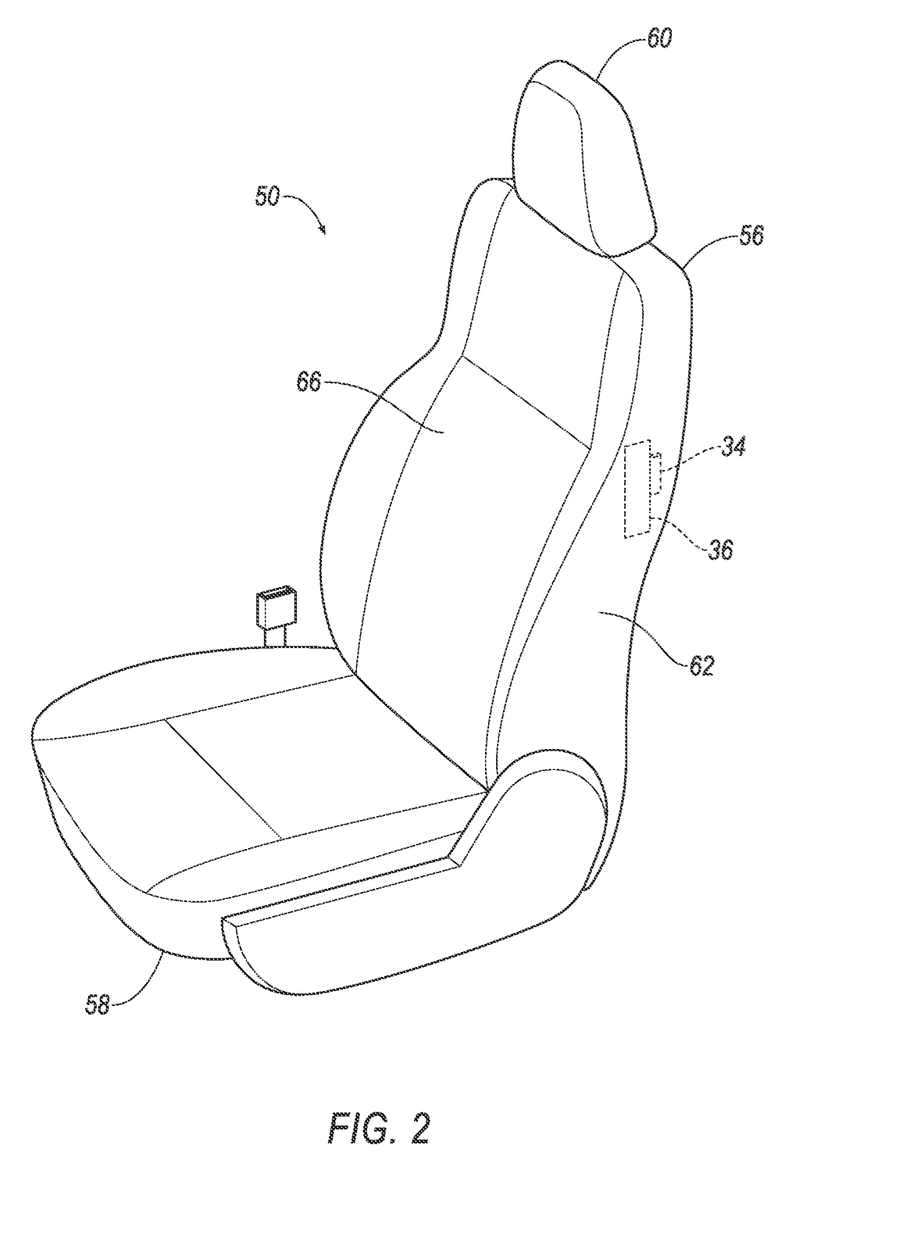
FIG. 2 is a perspective view of a seat in the passenger cabin.

With reference to FIG. 2, the driver seat 50 may include a seatback 56, a seat bottom 58, and a head restraint 60. The head restraint 60 may be supported by the seatback 56 and may be stationary or movable relative to the seatback 56. The seatback 56 may be supported by the seat bottom 58 and may be stationary or movable relative to the seat bottom 58. The seatback 56 includes an outboard side panel 62 facing in an outboard direction, an inboard side panel 64 facing in an inboard direction, and a front panel 66 facing forward and extending from the outboard side panel 62 to the inboard side panel 64. An occupant sitting in the driver seat 50 rests their back against the front panel 66 of the seatback 56. The seatback 56, the seat bottom 58, and/or the head restraint 60 may be adjustable in multiple degrees of freedom. Specifically, the seatback 56, the seat bottom 58, and/or the head restraint 60 may be themselves be adjustable, in other words, adjustable components within the seatback 56, the seat bottom 58, and/or the head restraint 60, and/or may be adjustable relative to each other.

The inflator 34 is connected to the airbag 36 and mounted in the seatback 56. Upon receiving a signal from, e.g., a controller 68, the inflator 34 may inflate the airbag 36 with an inflation medium, such as a gas. Specifically, the airbag 36 has an inflation chamber (not numbered) that receives the inflation medium, i.e., is inflated by the inflation medium. The inflator 34 may be, for example, a pyrotechnic inflator that uses a chemical reaction to drive inflation medium to the airbag 36. The inflator 34 may be of any suitable type, for example, a cold-gas inflator.

Figure 3:
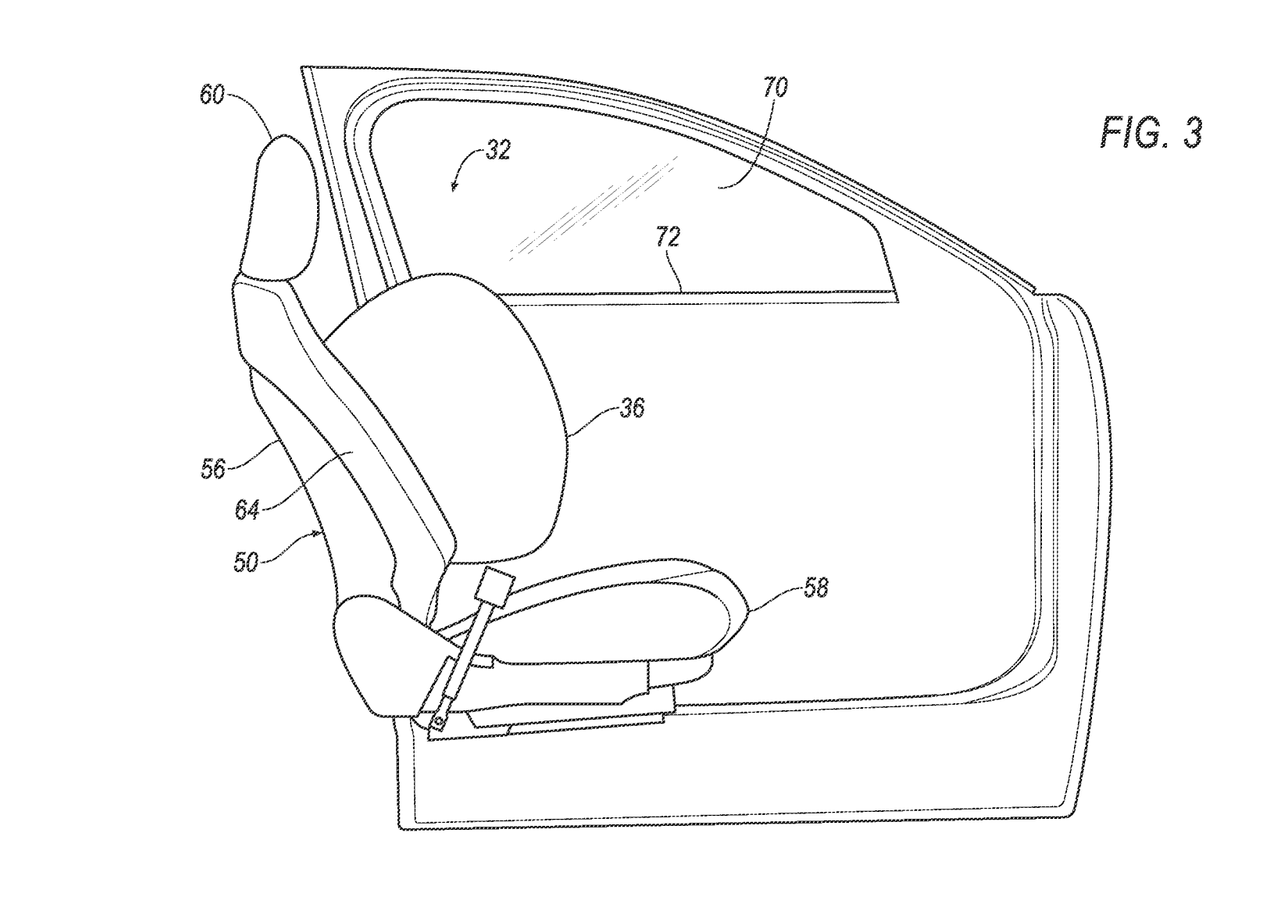
FIG. 3 is a side view of the seat with an airbag in an inflated position.

With reference to FIGS. 2 and 3, the airbag 36 is inflatable by the inflator 34 from an uninflated position to an inflated position. The airbag 36 in the uninflated position is disposed in the seatback 56 and concealed behind the outboard side panel 62, as shown in FIG. 2. The outboard side panel 62 can be frangible relative to a force of inflation of the airbag 36. The airbag 36 is inflatable from the outboard side panel 62 in a forward direction relative to the seatback 56. The airbag 36 in the inflated position extends forward of the seatback 56 and extends between an occupant sitting against the seatback 56 and a window 70 nearest the seatback 56, i.e., the window 70 directly outboard of the seatback 56, as shown in FIG. 3. The airbag 36 in the inflated position extends below a top of a door panel 72 to which the window 70 is mounted.

Figure 4:
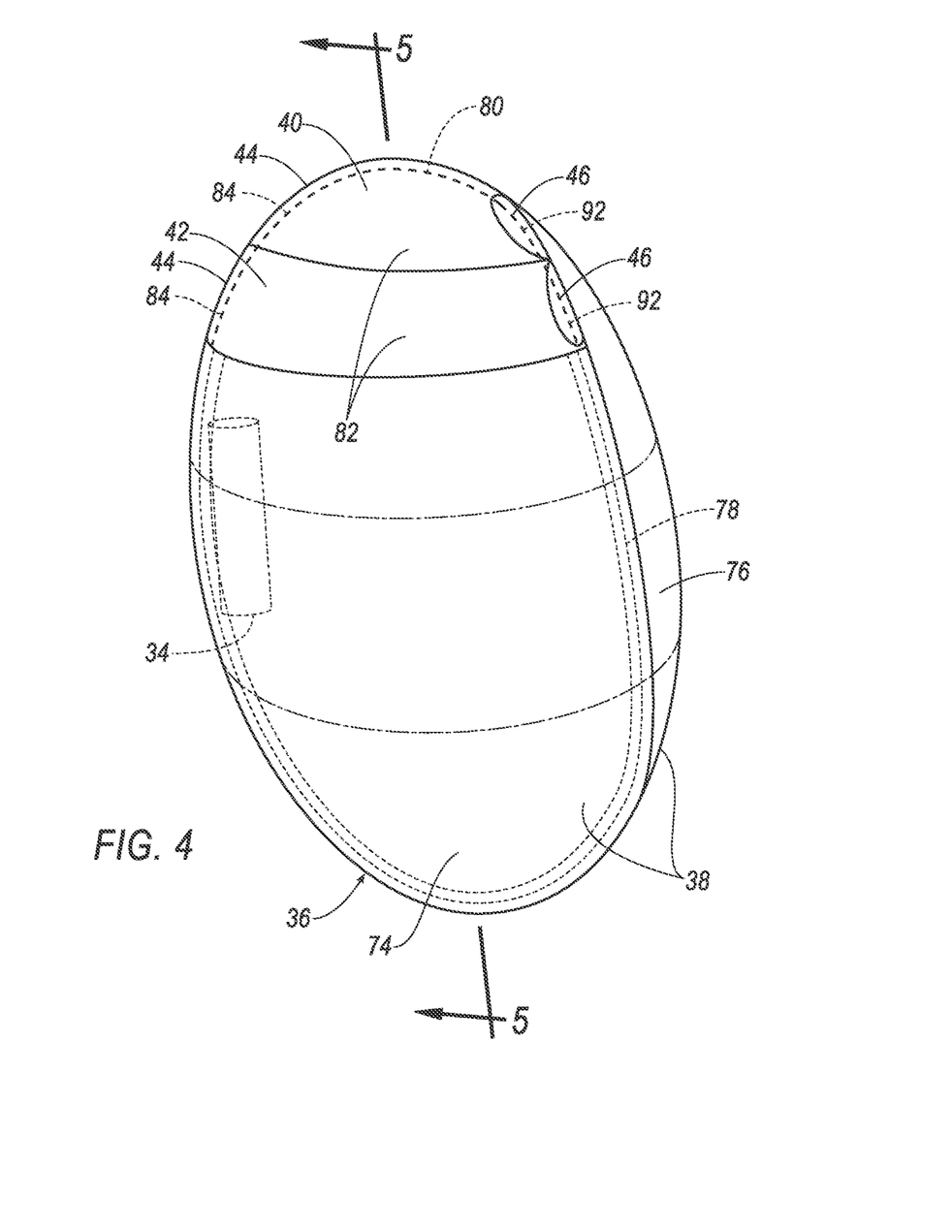
FIG. 4 is a perspective view of the airbag in the inflated position.

With reference to FIG. 4, the airbag 36 includes an outboard panel 74, an inboard panel 76, and an airbag seam 78 at which the outboard panel 74 is sewn to the inboard panel 76. When the airbag 36 is in the inflated position, the inboard panel 76 faces inboard toward the seatback 56, and the outboard panel 74 faces outboard toward the window 70 and door panel 72 and away from the seatback 56. When the airbag 36 is in the inflated position, the airbag seam 78 extends along a top, along a front, and along a bottom of the airbag 36. The exterior surface 38 of the airbag 36 is an outside face of the inboard panel 76 and an outside face of the outboard panel 74.

The airbag 36 may be formed of any suitable airbag material, for example, a woven polymer. For example, the airbag 36 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

Figure 5A:
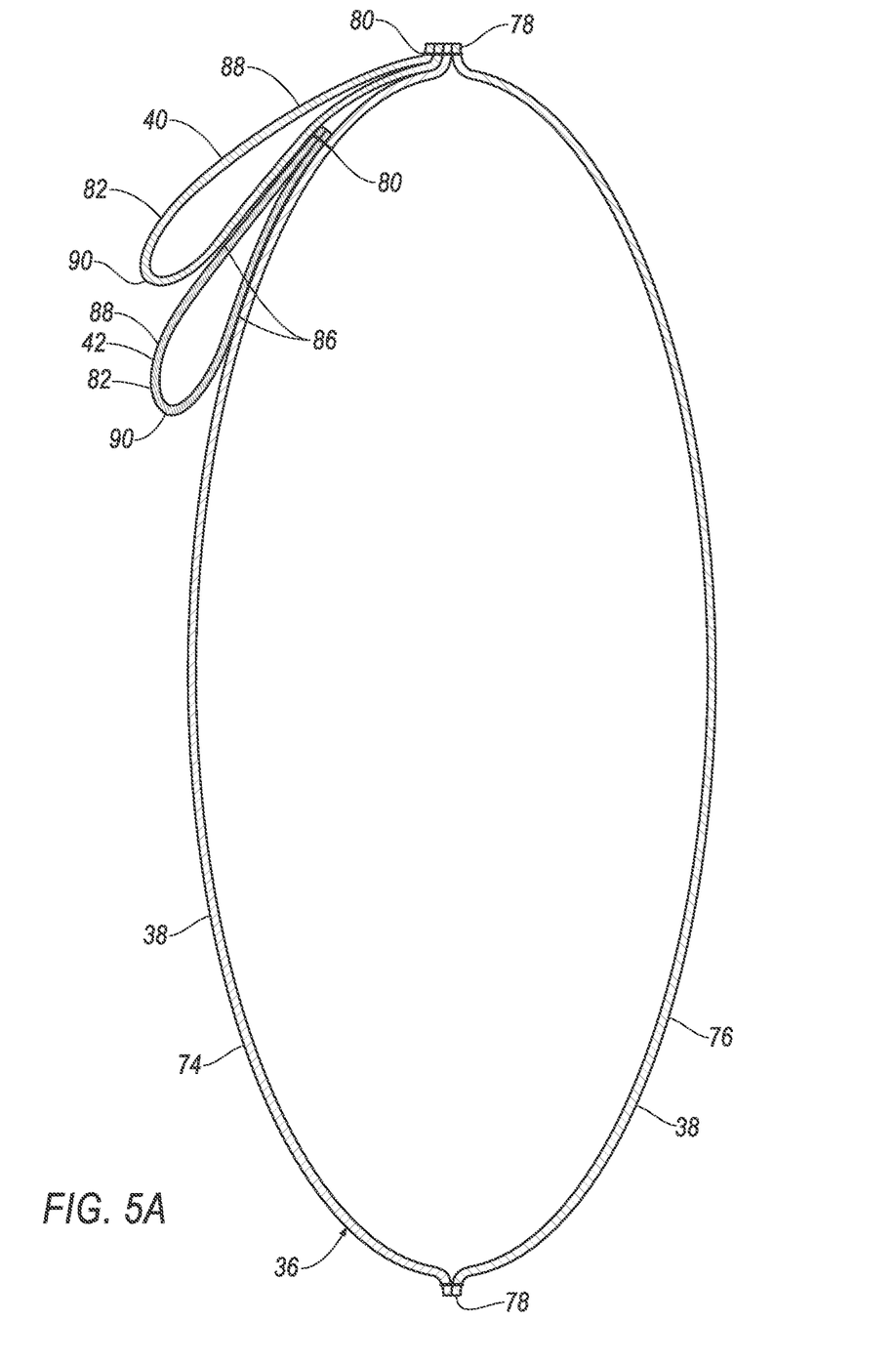
FIG. 5A is a cross-sectional view of the airbag in the inflated position with a first example of tunnels.
Figure 5B:
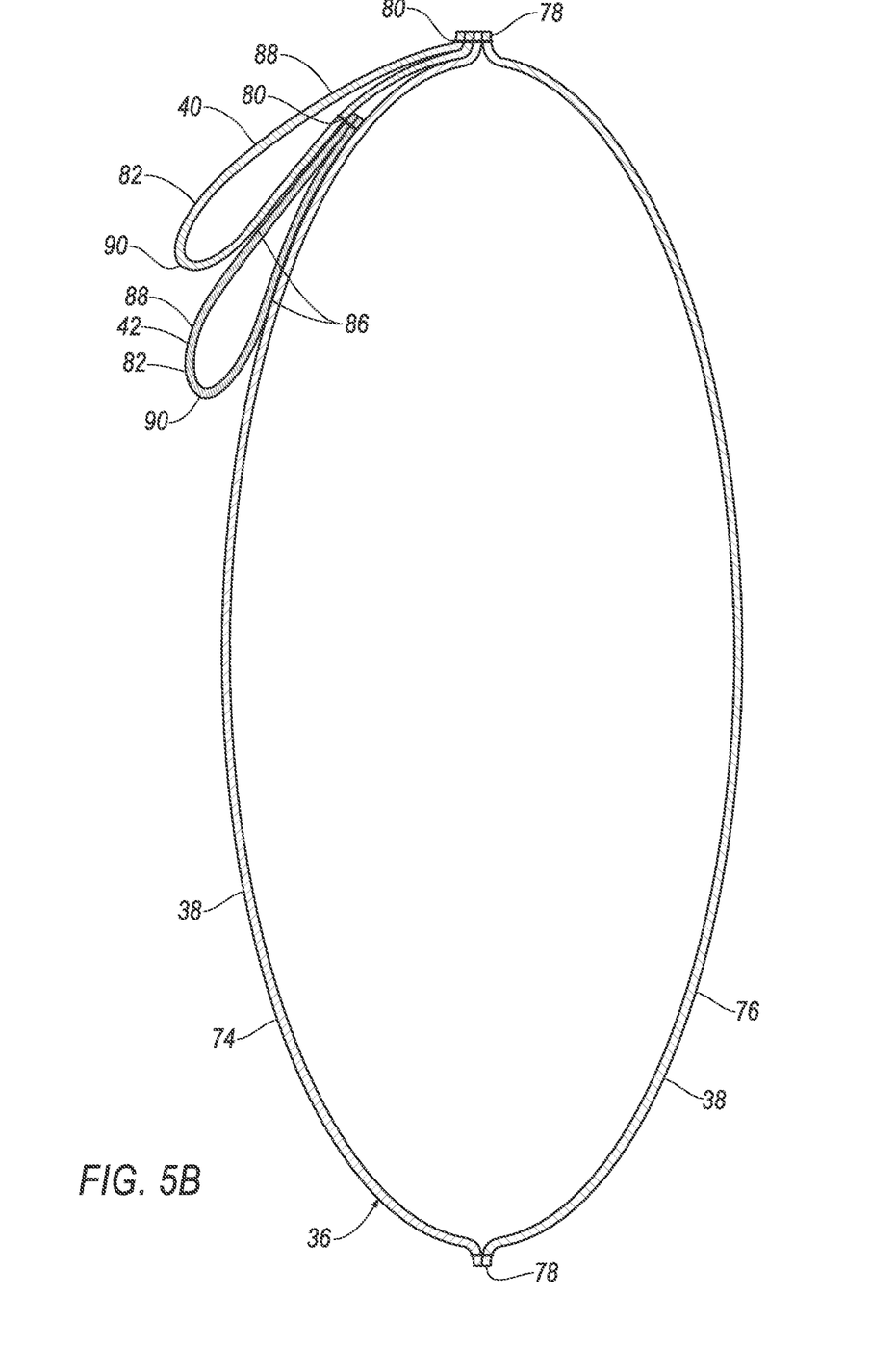
FIG. 5B is a cross-sectional view of the airbag in the inflated position with a second example of tunnels.

With reference to FIGS. 4-5B, the first tunnel 40 and the second tunnel 42 are attached to the airbag 36. When the airbag 36 is in the inflated position, the first tunnel 40 is disposed higher than the second tunnel 42; the first tunnel 40 is disposed at a top of the airbag 36, and the second tunnel 42 is spaced from the top of the airbag 36. When the airbag 36 is in the inflated position, the first tunnel 40 and the second tunnel 42 extend along the exterior surface 38 of the outboard panel 74 of the airbag 36. The first tunnel 40 and the second tunnel 42 partially overlap along the exterior surface 38 of the airbag 36. The first tunnel 40 is above a top of the door panel 72. The first tunnel 40 is attached to the airbag 36 at the airbag seam 78.

The first tunnel 40 and the second tunnel 42 are made of fabric. For example, the tunnels 40, 42 are made of the same material as the airbag 36, as described above. For another example, the tunnels 40, 42 are made of a fabric with a higher resistance to tearing than the material of the airbag 36, e.g., Kevlar, a fabric with a higher denier than the fabric of the airbag 36, etc.

The first tunnel 40 and the second tunnel 42 are each elongated from the sealed end 44 to the open end 46. The first tunnel 40 and second tunnel 42 each include a first seam 80 extending from the sealed end 44 to the open end 46, a tunnel panel 82 stitched to itself along the first seam 80 to form a loop shape, and a second seam 84 closing the sealed end 44. The tunnel panel 82 is folded over itself to form the loop shape and thereby defines an inboard portion 86 and an outboard portion 88 divided by a fold 90. The inboard portion 86 faces toward the airbag 36, and the outboard portion 88 faces away from the airbag 36. The tunnel panel 82 is stitched to itself along the first seam 80 and along the second seam 84. The second seam 84 extends from the first seam 80 to the fold 90. The tunnels 40, 42 are sealed other than at the open end 46.

The tunnels 40, 42 are directly or indirectly attached to the airbag 36 with the first seam 80 and the second seam 84. The first seam 80 and the second seam 84 of the first tunnel 40 are sewn to the airbag seam 78. The first seam 80 of the second tunnel 42 can be sewn to the outboard panel 74 of the airbag 36, as shown in FIG. 5A, and the second seam 84 of the second tunnel 42 can be sewn to the airbag seam 78. Alternatively, the first seam 80 of the second tunnel 42 can be sewn to the inboard portion 86 of the first tunnel 40, as shown in FIG. 5B. The first seams 80 of the tunnels 40, 42 are positioned at a top of the respective tunnels 40, 42. The first tunnel 40 and the second tunnel 42 each include a third seam 92. For each of the tunnels 40, 42, the third seam 92 sews the inboard portion 86 at the open end 46 to the airbag 36, e.g., to the airbag seam 78. The third seam 92 extends from the first seam 80 to the fold 90. The inboard portion 86 of each of the tunnels 40, 42 is attached, e.g., sewn, to the airbag 36 with the first seam 80, the second seam 84, and the third seam 92. The outboard portion 88 of each of the tunnels 40, 42 is attached, e.g., sewn, to the airbag 36 with the first seam 80 and the second seam 84. Between the sealed end 44 and the open end 46, the tunnels 40, 42 are attached to the airbag 36 only along the first seam 80; the fold 90 is not attached to the airbag 36 except at the open end 46 and the sealed end 44.

The open ends 46 of the tunnels 40, 42 are open to an environment external to the airbag 36, i.e., are open to the passenger cabin 48. In other words, air from the passenger cabin 48 can freely flow into and out of the tunnels 40, 42 through the open ends 46. Other than the open ends 46, the tunnels 40, 42 are sealed, i.e., block airflow. Other than the open ends 46, the tunnels 40, 42 are fluidly isolated from each other. The tunnels 40, 42 are fluidly isolated from the airbag 36 and the inflator 34; i.e., when the inflator 34 inflates the airbag 36, none of the inflation medium flows directly from the inflation chamber into the tunnels 40, 42.

The tunnels 40, 42 are oriented relative to the airbag 36 so that the open ends 46 are aimed in a direction of motion during inflation of the airbag 36. When the airbag 36 inflates in a forward direction, the open ends 46 of the tunnels 40, 42 are aimed forward and are the farthest forward part of the tunnels 40, 42. The tunnels 40, 42 are oriented so that the open end 46 is forwardmost and the sealed end 44 is rearwardmost when the airbag 36 is in the inflated position. When the airbag 36 inflates, air thus flows into the tunnels 40, 42 at the open ends 46 and expands the tunnels 40, 42.

Figure 6:
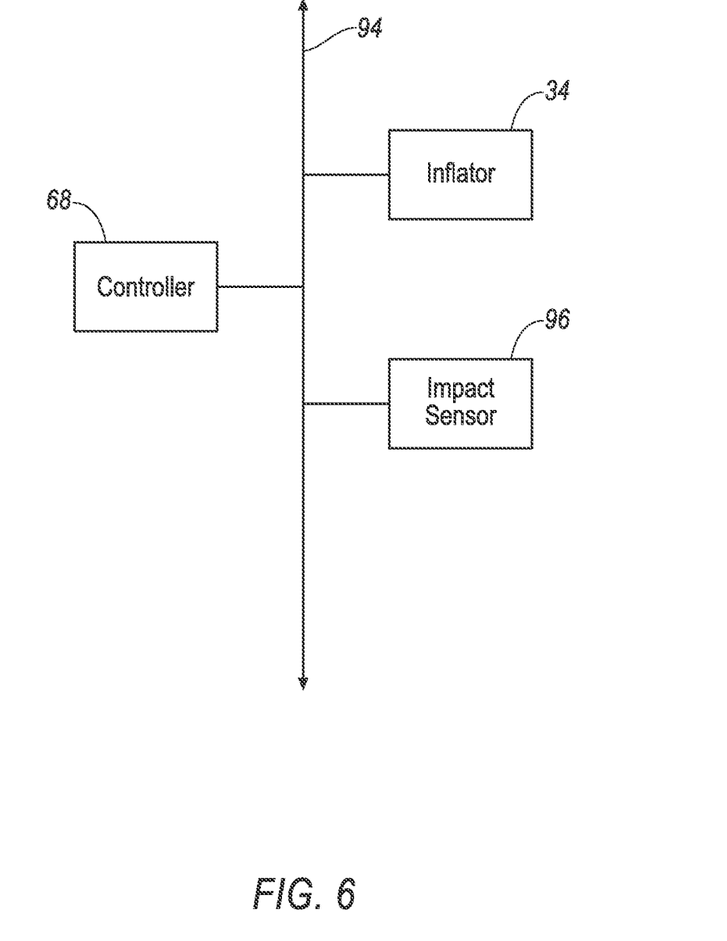
FIG. 6 is a block diagram of a control system for the airbag.

With reference to FIG. 6, the controller 68 is a microprocessor-based controller. The controller 68 includes a processor, a memory, etc. The memory of the controller 68 includes media for storing instructions executable by the processor as well as for electronically storing data and/or databases. The controller 68 may be a restraint control module.

The controller 68 may transmit and receive data through a communications network 94 such as a controller area network (CAN) bus, Ethernet, WiFi, Local Interconnect Network (LIN), onboard diagnostics connector (OBD-II), and/or by any other wired or wireless communications network. The controller 68 may be communicatively coupled to the inflator 34, an impact sensor 96, and other components via the communications network 94.

The impact sensor 96 is adapted to detect an impact to the vehicle 30. The impact sensor 96 may be of any suitable type, for example, post-contact sensors such as linear or angular accelerometers, gyroscopes, pressure sensors, and contact switches; and pre-impact sensors such as radar, lidar, and vision-sensing systems. The vision systems may include one or more cameras, CCD image sensors, CMOS image sensors, etc. The impact sensor 96 may be located at numerous points in or on the vehicle 30.

In the event of an impact, the impact sensor 96 can detect the impact and transmit a signal through the communications network 94 to the controller 68. The controller 68 can transmit a signal through the communications network 94 to the inflator 34. The inflator 34 can discharge and inflate the airbag 36. As the airbag 36 inflates, air from the passenger cabin 48 flows through the open ends 46 into the tunnels 40, 42, expanding the tunnels 40, 42 by pushing the outboard portions 88 of the tunnels 40, 42 away from the inboard portions 86 of the tunnels 40, 42. If the impact causes the window 70 to break, the spacing of the outboard portions 88 of the tunnels 40, 42 from the outboard panel 74 of the airbag 36 can help prevent pieces of glass from puncturing the airbag 36. Even if the tunnels 40, 42 have not expanded, the material of the tunnel panels 82 can help prevent pieces of glass from puncturing the airbag 36.

The disclosure has been described in an illustrative manner, and it is to be understood that the terminology which has been used is intended to be in the nature of words of description rather than of limitation. The adjectives "first," "second," and "third" are used throughout this document as identifiers and are not intended to signify importance or order. Many modifications and variations of the present disclosure are possible in light of the above teachings, and the disclosure may be practiced otherwise than as specifically described.

What is claimed is:

1. A restraint system comprising:
   an inflator;
   an airbag inflatable by the inflator and having an exterior surface;
   a fabric tunnel attached on the exterior surface of the airbag and elongated from a sealed end to an open end, the tunnel fluidly isolated from the inflator; and
   a seatback;
   wherein the airbag is inflatable from an uninflated position disposed in the seatback;
   the airbag is inflatable to an inflated position between an occupant sitting against the seatback and a window nearest the seatback;
   the tunnel is above a top of a door panel to which the window is mounted when the airbag is in the inflated position; and
   the airbag in the inflated position extends below the top of the door panel.

2. The restraint system of claim 1, wherein the tunnel is oriented relative to the airbag so that the open end is aimed in a direction of motion during inflation of the airbag.

3. The restraint system of claim 1, wherein the open end is open to an environment external to the airbag.

4. The restraint system of claim 1, wherein the tunnel includes a seam and a tunnel panel stitched to itself along the seam from the sealed end to the open end.

5. The restraint system of claim 4, wherein the tunnel is attached to the airbag along the seam.

6. The restraint system of claim 5, wherein between the sealed end and the open end, the tunnel is attached to the airbag only along the seam.

7. The restraint system of claim 4, wherein the seam is a first seam, the tunnel includes a second seam sealing the sealed end, and the tunnel is attached to the airbag along the second seam.

8. The restraint system of claim 1, wherein the tunnel is a first tunnel, the restraint system further comprising a second tunnel disposed on the exterior surface of the airbag and elongated from a sealed end to an open end, wherein the second tunnel is fluidly isolated from the inflator.

9. The restraint system of claim 8, wherein the open ends of the first tunnel and the second tunnel are open to an environment external to the airbag, and the first tunnel and the second tunnel are otherwise fluidly isolated from each other.

10. The restraint system of claim 8, wherein the first tunnel and the second tunnel partially overlap along the exterior surface of the airbag.

11. The restraint system of claim 1, wherein the seatback includes a side panel, and the airbag is inflatable from the side panel.

12. The restraint system of claim 1, wherein the airbag is inflatable in a forward direction relative to the seatback from the uninflated position to the inflated position, and the tunnel is oriented relative to the airbag so that the open end is forwardmost and the sealed end is rearwardmost when the airbag is in the inflated position.

13. The restraint system of claim 1, wherein the airbag includes an outboard panel, an inboard panel, and an airbag seam at which the outboard panel is sewn to the inboard panel, the airbag seam is at a top of the airbag when the airbag is in the inflated position, and the tunnel is attached to the airbag at the airbag seam.

14. The restraint system of claim 13, wherein the tunnel includes a first seam and a tunnel panel stitched to itself along the first seam from the sealed end to the open end, and the first seam is sewn to the airbag seam.

15. A restraint system comprising:
    an inflator;
    an airbag inflatable by the inflator and having an exterior surface;
    a fabric first tunnel attached on the exterior surface of the airbag and elongated from a sealed end to an open end, the first tunnel fluidly isolated from the inflator; and
    a second tunnel disposed on the exterior surface of the airbag and elongated from a sealed end to an open end, the second tunnel fluidly isolated from the inflator;
    wherein the first tunnel and the second tunnel partially overlap along the exterior surface of the airbag.

16. A restraint system comprising:
    an inflator;
    an airbag inflatable by the inflator and having an exterior surface;

a fabric tunnel attached on the exterior surface of the airbag and elongated from a sealed end to an open end, the tunnel fluidly isolated from the inflator; and a seatback;

wherein the airbag is inflatable from an uninflated position disposed in the seatback to an inflated position;

the airbag includes an outboard panel, an inboard panel, and an airbag seam at which the outboard panel is sewn to the inboard panel;

the airbag seam is at a top of the airbag when the airbag is in the inflated position; and the tunnel is attached to the airbag at the airbag seam.

17. The restraint system of claim 16, wherein the tunnel includes a first seam and a tunnel panel stitched to itself along the first seam from the sealed end to the open end, and the first seam is sewn to the airbag seam.

* * * * *